(12) United States Patent
Liu et al.

(10) Patent No.: US 10,641,621 B1
(45) Date of Patent: May 5, 2020

(54) AUTOMATIC WHEEL DETECTING DEVICE

(71) Applicant: CITIC Dicastal Co., Ltd., Qinhuangdao (CN)

(72) Inventors: Huiying Liu, Qinhuangdao (CN); Dong Guo, Qinhuangdao (CN)

(73) Assignee: CITIC Dicastal Co., Ltd., Qinhuangdao (CN)

(*) Notice: Subject to any disclaimer, the term of this patent is extended or adjusted under 35 U.S.C. 154(b) by 0 days.

(21) Appl. No.: 16/669,451

(22) Filed: Oct. 30, 2019

(30) Foreign Application Priority Data

Apr. 29, 2019 (CN) .......................... 2019 1 0353266

(51) Int. Cl.
| | |
|---|---|
| *G01D 5/26* | (2006.01) |
| *B21D 43/00* | (2006.01) |
| *B21D 53/26* | (2006.01) |
| *G01M 17/013* | (2006.01) |
| *G01M 17/02* | (2006.01) |

(52) U.S. Cl.
CPC ............. *G01D 5/26* (2013.01); *B21D 43/003* (2013.01); *B21D 53/26* (2013.01); *G01M 17/013* (2013.01); *G01M 17/021* (2013.01)

(58) Field of Classification Search
None
See application file for complete search history.

(56) References Cited

U.S. PATENT DOCUMENTS

2018/0003592 A1* 1/2018 Liu ..................... G01M 17/013

* cited by examiner

*Primary Examiner* — Michelle M Iacoletti
(74) *Attorney, Agent, or Firm* — IPro, PLLC; Qian Gu

(57) ABSTRACT

The disclosure discloses an automatic wheel detecting device. The device can automatically detect marks of spoke back cavities and the inner side coaxiality and the outer side coaxiality of wheels, the wheels with marks being missed are identified in time, the values of the inner side coaxiality and the outer side coaxiality of the wheels on a production line are monitored in time, if the values are out of tolerance, an alarm is given out in time, and the device can be used for automatic production.

8 Claims, 3 Drawing Sheets

AUTOMATIC WHEEL DETECTING DEVICE

FIELD

The present disclosure relates to the technical field of automatic wheel detection, in particular to an automatic wheel detecting device.

BACKGROUND

In the production process of wheels, in order to achieve traceability, marks are made in each procedure, and the marks are located in spoke back cavities generally. After wheels are machined, machining procedure mark numbers are printed on the spoke back cavities through manipulators. During automatic detection, the mark numbers need to be identified at first, and then detected data correspond to wheel numbers. In this process, if the machining marks are omitted, the wheels can be checked in time. Wheel production is generally completed by two procedures, there is a coaxiality deviation between the inner side and the outer side, when the coaxiality deviation is too large, balance and runout out of tolerance exists, and customers have clear requirements for the inner side coaxiality and the outer side coaxiality, so that the coaxiality needs to be strictly controlled in the production process.

SUMMARY

In view of the situation, the disclosure aims to provide an automatic wheel detecting device capable of automatically detecting marks of spoke back cavities and the inner side coaxiality and the outer side coaxiality of wheels, the wheels with marks being missed are identified in time, the values of the inner side coaxiality and the outer side coaxiality of the wheels on a production line are monitored in time, if the values are out of tolerance, an alarm is given out in time, the device can be used for automatic production and has great effect in product quality control.

In order to achieve the above objectives, the technical solutions of the disclosure are achieved as follows:

An automatic wheel detecting device comprises a machine base, a workbench, upper guide columns and an upper air cylinder; the upper air cylinder and the upper guide columns are mounted in the center of the top of the machine base; the output end of the upper air cylinder is connected with a moving platform I; the upper air cylinder controls the moving platform I to move up and down under the guiding action of the upper guiding columns; a servo motor I is mounted in the center of the bottom of the moving platform I; the output end of the servo motor I is connected with a rotating table; an adjusting air cylinder is arranged on the outer edge of the rotating table; an adjusting guide rail is further arranged at the position, corresponding to the adjusting air cylinder, of the rotating table; a sliding block is connected with the output end of the adjusting air cylinder; the sliding block is mounted on the adjusting guide rail; a visual sensor I is arranged at the bottom of the sliding block; and a visual sensor II is arranged in the center of the bottom of the rotating table.

The visual sensor I is used for identifying the wheel back cavity machining marks, and the horizontal position of the visual sensor I can be adjusted through the adjusting air cylinder, so that the device can adapt to detection of the wheels with different diameters and at different positions, and the identifying accuracy is improved. By driving the rotating table to rotate through the servo motor I, the visual sensor I can accurately identify the position of the machining mark in the circumferential direction. The vision sensor II is mounted in the center of the bottom of the rotating table, and the vision sensor II is used for identifying the contour of a center hole and locating the circle center of the center hole.

Further, the two sides of the moving platform I are provided with a left side arm and a right arm which extend downwards; the right side arm is provided with a servo motor II; the output end of the servo motor II is connected with a rotating frame; the servo motor II can drive the rotating frame to rotate; the rotating frame is provided with an electric cylinder and lower guide columns; the output end of the electric cylinder is connected with a moving platform II; the electric cylinder controls the moving platform II to move up and down under the guiding action of the lower guide columns; an inner air cylinder is arranged in the center of the moving platform II; and the output end of the inner air cylinder is connected with a tensioning structure.

Further, the two sides, corresponding to the output end of the servo motor II, of the rotating frame are provided with a left shaft and a right shaft; the output end of the servo motor II is connected with the rotating frame through the right shaft; and the rotating frame is connected with the moving platform I through the left shaft.

Further, air cylinders I and support plates are symmetrically mounted at the left end and the right end of the inner side of the rotating frame; the output ends of the air cylinders I are connected with sliding tables; the support plates are provided with guide rails; the sliding tables are mounted on the guide rails; the output ends of the air cylinders II are connected with guide columns; and the tail ends of the guide columns are provided with a left clamping jaw and a right clamping jaw.

The air cylinders II can adjust the heights of the left clamping jaw and the right clamping jaw, and the positions of the clamping jaws can be adjusted through the air cylinders I and the air cylinders II so that the clamping jaws can adaptively clamp different types of wheels.

Further, the left shaft and the right shaft have the same axis.

Further, the tensioning structure comprises a tensioning core and a tensioning sleeve; the output end of an inner air cylinder is connected with a pull rod; the pull rod is connected with the tensioning core; and the tensioning core is externally sleeved with the tensioning sleeve.

The tensioning core is matched with the tensioning sleeve, the inner cylinder is used for tensioning the tensioning core, thus, the tensioning sleeve can tension the cap spigot of the wheel in the diameter direction, and after the tensioning sleeve tensions the cap spigot of the wheel, the left clamping jaw and the right clamping jaw can be started simultaneously and clamp the wheel in an assisting mode.

Further, the vision sensor II is coaxial with the center of the tensioning sleeve.

Further, the electric cylinder is mounted in the center of the rotating frame.

Compared with the prior art, the automatic wheel detecting device of the disclosure has the following advantages that:

The moving platform I and the moving platform II form a double-layer height adjustment system, the height of the tensioning sleeve can be quickly adjusted through downward movement of the moving platform I, thus, the tensioning sleeve approaches the cap spigot of the wheel, and coarse adjustment is achieved; and the height of the tensioning sleeve is adjusted precisely through downward movement of the moving platform II, so that the tensioning sleeve is located in the cap spigot of the wheel, and precise adjustment is achieved.

The visual sensor II of the device is coaxial with the center of the tensioning sleeve, after the cap spigot of the wheel is tensioned, the cap spigot will be coaxial with the visual sensor II, and the coaxiality deviation can be obtained after the circle center of the center hole is detected by the visual sensor II and compared with the central point of equipment.

The device can automatically detect the marks of spoke back cavities and the inner side coaxiality and the outer side coaxiality of wheels, by the double-layer height adjustment system, the rapid coarse adjustment and precise adjustment can be realized, the structural design is ingenious, the detecting method is advanced, the wheels with marks being missed are identified in time, the values of the inner side coaxiality and the outer side coaxiality of the wheels on a production line are monitored in time, if the values are out of tolerance, an alarm is given out in time, and the device has great effect in product quality control.

BRIEF DESCRIPTION OF THE DRAWINGS

The drawings constituting part of the disclosure are used for providing a further understanding of the disclosure, and the illustrative embodiments of the disclosure and explanations thereof are used for explaining the disclosure without undue limitations on the disclosure. In the drawings.

DESCRIPTIONS OF NUMERALS IN THE DRAWINGS

1—Machine base, 2—Workbench, 3—Left bearing seat, 4—Bearing, 5—Left shaft, 6—Left clamping jaw, 7—Guide column, 8—Guide sleeve, 9—Support plate, 10—Air cylinder I, 11—Guide rail, 12—Sliding table, 13—Air cylinder II, 14—Rotating frame, 15—Adjusting air cylinder, 16—Adjusting guide rail, 17—Visual sensor I, 18—Sliding block, 19—Upper guide column, 20—Upper air cylinder, 21—Moving platform I, 22—Servo motor I, 23—Shaft, 24—Rotating table, 25—Vision sensor II, 26—Electric cylinder, 27—Lower guide column, 28—Moving platform II, 29—Inner air cylinder, 30—Tensioning sleeve, 31—Tensioning core, 32—Right clamping jaw, 33—Right bearing seat, 34—Coupling, 35—Right shaft and 36—Servo motor II.

DETAILED DESCRIPTION

It should be noted that the embodiments of the disclosure and the features of the embodiments may be combined with each other without conflicts.

The technical solutions of the disclosure will be described clearly and completely hereinafter with reference to the drawings and the embodiments, and obviously, the embodiments described herein are only a part of the embodiments of the disclosure. All other embodiments obtained by those skilled in the art based on the embodiments of the disclosure without creative efforts are within the scope of protection of the disclosure.

An automatic wheel detecting device according to embodiments of the disclosure will be described below with reference to FIGS. 1 to 3.

Figure 1:
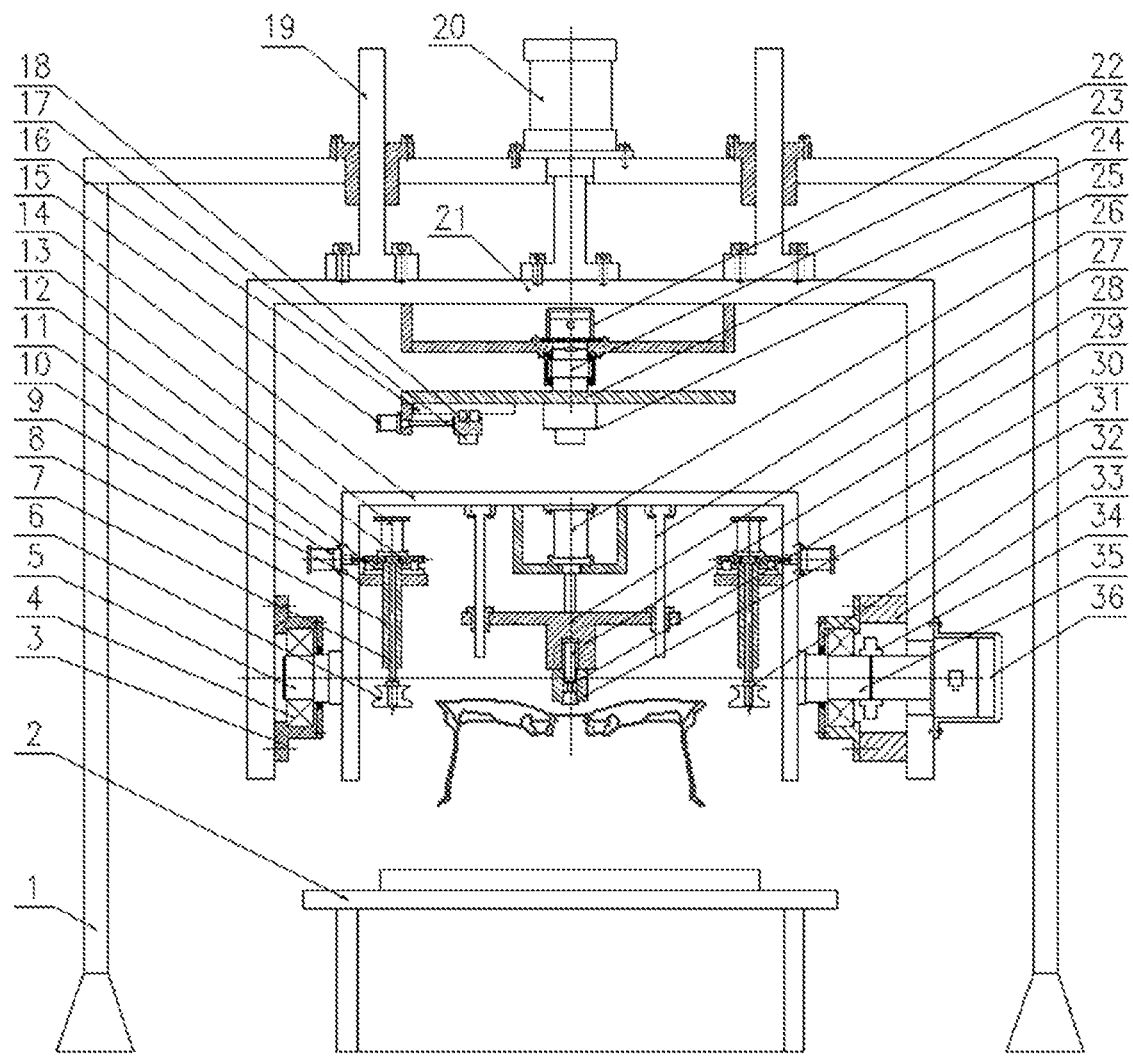
FIG. 1 is a front view of an automatic wheel detecting device of the disclosure.
Figure 2:
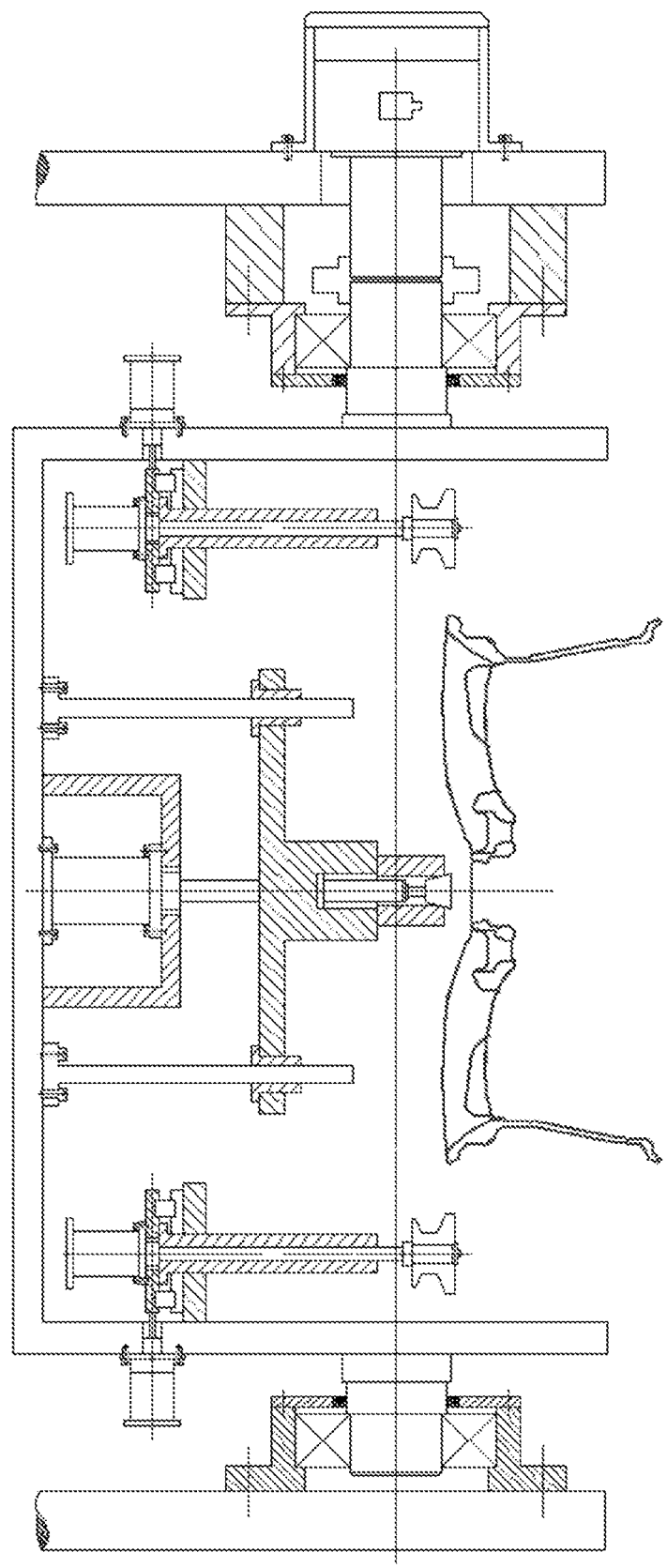
FIG. 2 is a partial enlarged view of a wheel turning mechanism of an automatic wheel detecting device of the disclosure.
Figure 3:
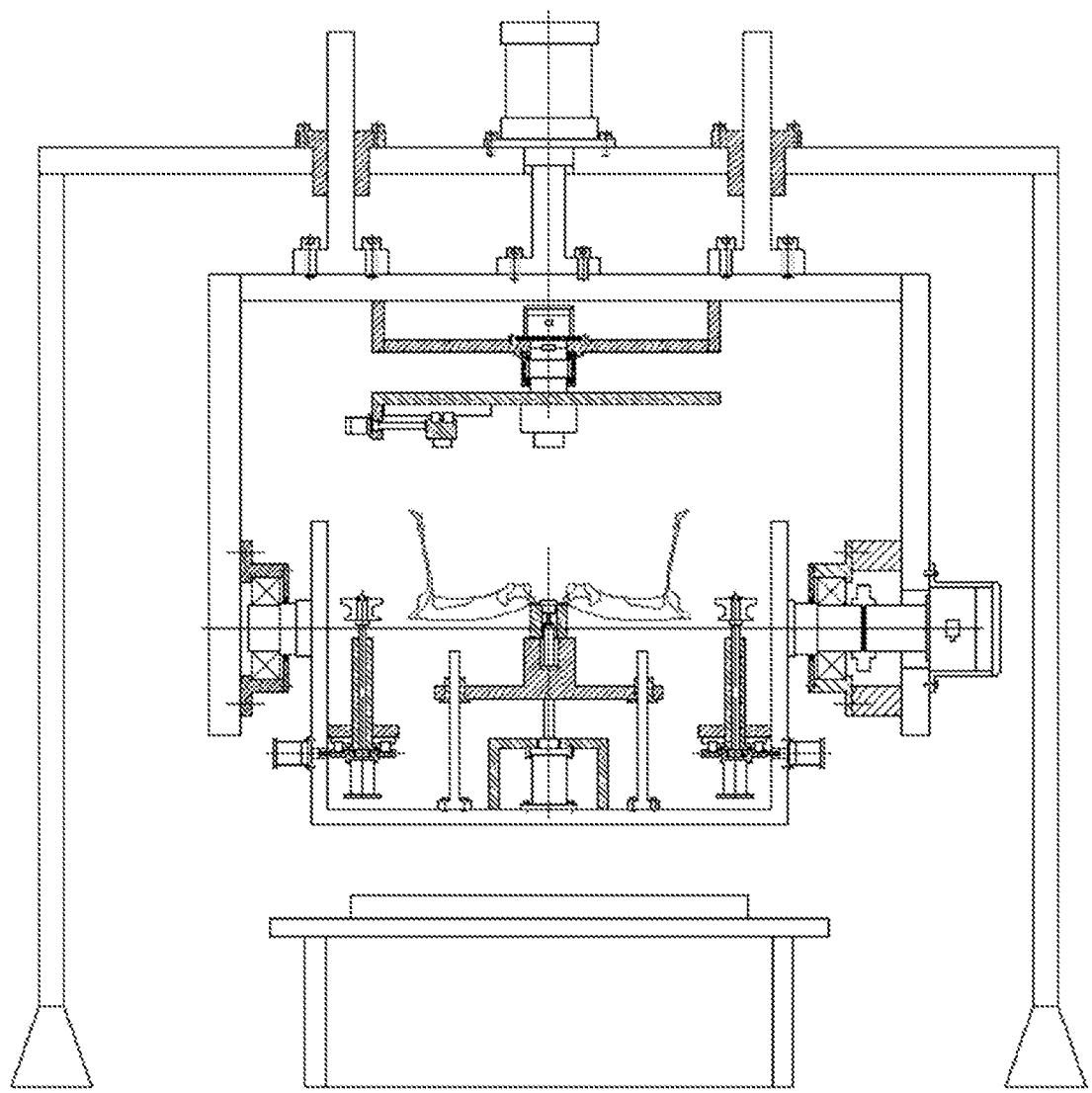
FIG. 3 is a schematic view of an automatic wheel detecting device in detection of the disclosure.

As shown in FIGS. 1 to 3, a wheel automatic detecting device comprises a machine base 1, a workbench 2, a left bearing seat 3, a bearing 4, a left shaft 5, a left clamping jaw 6, guide columns 7, guide sleeves 8, support plates 9, air cylinders I 10, guide rails 11, sliding tables 12, air cylinders II 13, a rotating frame 14, an adjusting air cylinder 15, an adjusting guide rail 16, a visual sensor I 17, a sliding block 18, upper guide columns 19, an upper air cylinder 20, a moving platform I 21, a servo motor I 22, a shaft 23, a rotating table 24, a visual sensor II 25, an electric cylinder 26, lower guide columns 27, a moving platform II 28, an inner air cylinder 29, a tensioning sleeve 30, a tensioning core 31, a right clamping 32, a right bearing seat 33, a coupling 34, a right shaft 35, a servo motor II 36 and other structures.

The upper air cylinder 20 is mounted in the center of the top of the machine base 1; the output end of the upper air cylinder 20 is connected with the moving platform I 21; the upper air cylinder 20 controls the moving platform I 21 to move up and down under the guiding action of the upper guide columns 19; the servo motor I 22 is mounted in the center of the bottom of the moving platform I 21; the output end of the servo motor I 22 is connected with the rotating table 24; the adjusting air cylinder 15 is arranged on the outer edge of the rotating table 24; the output end of the adjusting air cylinder 15 is connected with the sliding block 18; the sliding block 18 is mounted on the adjusting guide rail 16; the adjusting guide rail 16 is fixed under the rotating table 24; a visual sensor I 17 is fixed at the bottom of the sliding block 18; the visual sensor I 17 is used for identifying the wheel back cavity machining marks, and the horizontal position of the visual sensor I 17 can be adjusted through the adjusting air cylinder 15, so that the device adapts to detection of wheels with different diameters and at different positions, and the identifying accuracy is improved. By driving the rotating table 24 to rotate through the servo motor I 22, the visual sensor I 17 can accurately identify the position of the machining marks in the circumferential direction. The vision sensor II 25 is mounted in the center of the bottom of the rotating table 24, and the vision sensor II 25 is used for identifying the contour of a center hole and locating the circle center of the center hole.

The two sides of the moving platform I 21 are provided with a left side arm and a right arm; the right side arm of the moving platform I 21 is provided with the servo motor II 36; the output end of the servo motor II 36 is connected with the rotating frame 14 through the right shaft 35; the left shaft 5 is mounted at the left end of the rotating frame 14; the left shaft 5 is coaxial with the right shaft 35; the rotating frame 14 can be driven to rotate by the servo motor II 36; the center of the rotating frame 14 is provided with the electric cylinder 26; the output end of the electric cylinder 26 is connected with the moving platform 28 II; the electric cylinder 26 controls the moving platform II 28 to move up and down under the guiding action of the lower guide columns 27; the inner air cylinder 29 is arranged in the center of the moving platform II 28; the output end of the inner air cylinder 29 is connected with a pull rod; the pull rod is connected with a tensioning core 31; the tensioning core 31 is matched with the tensioning sleeve 30; and the tensioning sleeve 30 can tension the cap spigot of the wheel in the diameter direction by tensioning the tensioning core 31 through the inner air cylinder 29.

The left end of the inner side of the rotating frame 14 is provided with the air cylinder I 10; the output end of the air cylinder I 10 is connected with the sliding table 12; the sliding table 12 is mounted on the guide rail 11; the guide rail 11 is fixed on the support plate 9; the support plate 9 is fixed on the inner side of the rotating frame 14; the air cylinder I 10 can control the sliding table 12 to move left and right; the air cylinder II 13 is fixed on the sliding table 12; the output end of the air cylinder II 13 is connected with the guide column 7; the guide column 7 is matched with the guide sleeve 8; the guide sleeve 8 is fixed at the lower end of the sliding table 12; the left clamping jaw 6 is mounted at the tail end of the guide column 7; the height of the left clamping jaw 6 can be adjusted through the air cylinder II 13; a right end structure and a left end structure of the inner side of the rotating frame 14 are identical and symmetrical; and the position of the clamping jaw can be adjusted through the air cylinder I 10 and the air cylinder II 13, so that the clamping jaws adapt to wheel clamping of different specifications. After the tensioning sleeve 30 tensions the cap spigot of the wheel, the left clamping jaw 6 and the right clamping jaw 32 can be simultaneously started for assisting in clamping the wheel. The workbench 2 is arranged in the center of the bottom of the device. The surface of the workbench 2 has high flatness requirement, the wheel is placed on the workbench 2 through a manipulator, and the wheel can be axially positioned through the surface of the workbench 2.

The moving platform I 21 and the moving platform II 28 form a double-layer height adjustment system, the height of the tensioning sleeve 30 can be quickly adjusted through downward movement of the moving platform I 21, thus, the tensioning sleeve 30 approaches the cap spigot of the wheel, and coarse adjustment is achieved; and the height of the tensioning sleeve 30 is adjusted precisely through downward movement of the moving platform II 28, so that the tensioning sleeve 30 is located in the cap spigot of the wheel, and precise adjustment is achieved.

The cap spigot of the wheel is machined through two procedures, and the center hole is machined through one procedure. When the cap spigot completed through two procedures is used as the reference, the circle center of the center hole is measured and compared with the circle center of the cap spigot, and the coaxiality deviation can be measured. The visual sensor II 25 of the device is coaxial with the center of the tensioning sleeve 30, after the cap spigot of the wheel is tensioned, the cap spigot will be coaxial with the visual sensor II 25, and the coaxiality deviation can be obtained after the circle center of the center hole is detected by the visual sensor II 25 and compared with the central point of equipment.

The working process of the automatic wheel detecting device is as follows: the wheel is placed on the workbench 2 through a manipulator, an outer layer height adjusting system is started, the height of the tensioning sleeve 30 is quickly adjusted to approach the cap spigot of the wheel through downward movement of the moving platform I 21; then an inner layer height adjustment system is started, and the height of the tensioning sleeve 30 is precisely adjusted to be located in the cap spigot of the wheel through downward movement of the moving platform II 28; the inner air cylinder 29 is started to pull the tensioning core 31, and the tensioning sleeve 30 tensions the wheel; afterwards, the left clamping jaw 6 and the right clamping jaw 32 are synchronously started for assisting in clamping the wheel; the upper air cylinder 20 is started for lifting the clamped wheel by certain height, the servo motor II 36 is started for driving the rotating frame 14 to rotate by 180 degrees, thus, the back cavity of the wheel face upwards, then the visual sensor I 17 and the visual sensor II 25 are started to operate and detect the machining mark and the contour of the center hole, the position of the circle center of the center hole is found out, the circle center coordinates of the center hole are compared with the circle center coordinates of the visual sensor II 25, and the coaxiality deviation can be obtained.

Compared with the prior art, the automatic wheel detecting device of the disclosure has the following advantages that:

The moving platform I 21 and the moving platform II 28 form a double-layer height adjustment system, the height of the tensioning sleeve 30 can be quickly adjusted through downward movement of the moving platform I 21, thus, the tensioning sleeve 30 approaches the cap spigot of the wheel, and coarse adjustment is achieved; and the height of the tensioning sleeve 30 is adjusted precisely through downward movement of the moving platform II 28, so that the tensioning sleeve 30 is located in the cap spigot of the wheel, and precise adjustment is achieved.

The visual sensor II 25 of the device is coaxial with the center of the tensioning sleeve 30, after the cap spigot of the wheel is tensioned, the cap spigot will be coaxial with the visual sensor II 25, and the coaxiality deviation can be obtained after the circle center of the center hole is detected by the visual sensor II 25 and compared with the central point of equipment.

Compared with the prior art, the automatic wheel detecting device of the disclosure has the following advantages that:

The moving platform I and the moving platform II form a double-layer height adjustment system, the height of the tensioning sleeve can be quickly adjusted through downward movement of the moving platform I, thus, the tensioning sleeve approaches the cap spigot of the wheel, and coarse adjustment is achieved; and the height of the tensioning sleeve is adjusted precisely through downward movement of the moving platform II, so that the tensioning sleeve is located in the cap spigot of the wheel, and precise adjustment is achieved.

The visual sensor II of the device is coaxial with the center of the tensioning sleeve, after the cap spigot of the wheel is tensioned, the cap spigot will be coaxial with the visual sensor II, and the coaxiality deviation can be obtained after the circle center of the center hole is detected by the visual sensor II and compared with the central point of equipment.

The device can automatically detect the marks of spoke back cavities and the inner side coaxiality and the outer side coaxiality of wheels, by the double-layer height adjustment system, the rapid coarse adjustment and precise adjustment can be realized, the structural design is ingenious, the detecting method is advanced, the wheels with marks being missed are identified in time, the values of the inner side coaxiality and the outer side coaxiality of the wheels on a production line are monitored in time, if the values are out of tolerance, an alarm is given out in time, and the device has great effect in product quality control.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

The invention claimed is:

1. An automatic wheel detecting device, comprising a machine base, a workbench, upper guide columns and an upper air cylinder, wherein the upper air cylinder and the upper guide columns are mounted in the center of the top of the machine base; the output end of the upper air cylinder is connected with a first moving platform; the upper air cylinder controls the first moving platform to move up and down under the guiding action of the upper guiding columns; a first servo motor is mounted in the center of the bottom of the first moving platform; the output end of the first servo motor is connected with a rotating table; an adjusting air cylinder is arranged on the outer edge of the rotating table; an adjusting guide rail is further arranged at the position, corresponding to the adjusting air cylinder, of the rotating table; a sliding block is connected with the output end of the adjusting air cylinder; the sliding block is mounted on the adjusting guide rail; a first visual sensor is arranged at the bottom of the sliding block; and a second visual sensor is arranged in the center of the bottom of the rotating table.

2. The automatic wheel detecting device according to claim 1, wherein the two sides of the first moving platform are provided with a left side arm and a right arm which extend downwards; the right side arm is provided with a second servo motor; the output end of the second servo motor is connected with a rotating frame; the second servo motor can drive the rotating frame to rotate; the rotating frame is provided with an electric cylinder and lower guide columns; the output end of the electric cylinder is connected with a second moving platform; the electric cylinder controls the second moving platform to move up and down under the guiding action of the lower guide columns; an inner air cylinder is arranged in the center of the second moving platform; and the output end of the inner air cylinder is connected with a tensioning structure.

3. The automatic wheel detecting device according to claim 2, wherein first air cylinders and support plates are symmetrically mounted at the left end and the right end of the inner side of the rotating frame; the output ends of the first air cylinders are connected with sliding tables; the support plates are provided with guide rails; the sliding tables are mounted on the guide rails; the output ends of second air cylinders are connected with guide columns; and the tail ends of the guide columns are provided with a left clamping jaw and a right clamping jaw.

4. The automatic wheel detecting device according to claim 2, wherein the two sides, corresponding to the output end of the second servo motor, of the rotating frame are provided with a left shaft and a right shaft; the output end of the second servo motor is connected with the rotating frame through the right shaft; and the rotating frame is connected with the first moving platform through the left shaft.

5. The automatic wheel detecting device according to claim 4, wherein the left shaft and the right shaft have the same axis.

6. The automatic wheel detecting device according to claim 4, wherein the tensioning structure comprises a tensioning core and a tensioning sleeve; the output end of the inner air cylinder is connected with a pull rod; the pull rod is connected with the tensioning core; and the tensioning core is externally sleeved with the tensioning sleeve.

7. The automatic wheel detecting device according to claim 6, wherein the second visual sensor is coaxial with the center of the tensioning sleeve.

8. The automatic wheel detecting device according to claim 6, wherein the electric cylinder is mounted in the center of the rotating frame.

* * * * *